(12) United States Patent
Schulze

(10) Patent No.: US 6,488,418 B2
(45) Date of Patent: Dec. 3, 2002

(54) OPTOELECTRONIC COUPLING ELEMENT AND PRODUCTION METHOD

(75) Inventor: Joachim Schulze, Berlin (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/041,173

(22) Filed: Jan. 8, 2002

(65) Prior Publication Data

US 2002/0081079 A1 Jun. 27, 2002

Related U.S. Application Data

(63) Continuation of application No. PCT/DE01/01792, filed on May 8, 2001.

(30) Foreign Application Priority Data

May 8, 2000 (DE) .......................................... 100 23 221

(51) Int. Cl.[7] .................................................. G02B 6/42
(52) U.S. Cl. .......................................... 385/88; 385/93
(58) Field of Search .............................. 385/18, 88, 89, 385/92, 93

(56) References Cited

U.S. PATENT DOCUMENTS

| | | | |
|---|---|---|---|
| 5,479,540 A | | 12/1995 | Boudreau et al. ............. 385/14 |
| 6,092,935 A | * | 7/2000 | Althaus et al. ............... 385/93 |
| 6,142,680 A | * | 11/2000 | Kikuchi et al. .............. 385/93 |
| 6,243,508 B1 | * | 6/2001 | Jewell et al. ................. 385/14 |
| 6,267,515 B1 | * | 7/2001 | Okuda et al. ................ 385/88 |

FOREIGN PATENT DOCUMENTS

| | | |
|---|---|---|
| DE | 44 40 935 A1 | 5/1996 |
| DE | 198 32 830 A1 | 4/1999 |
| DE | 197 43 992 C2 | 6/1999 |
| EP | 0 395 854 A2 | 11/1990 |
| EP | 0 942 302 A2 | 9/1999 |
| EP | 0 992 823 A2 | 4/2000 |
| WO | WO 96/00919 | 1/1996 |

* cited by examiner

*Primary Examiner*—John D. Lee
*Assistant Examiner*—Jennifer Doan
(74) *Attorney, Agent, or Firm*—Laurence A. Greenberg; Werner H. Stemer; Ralph E. Locher

(57) ABSTRACT

The optoelectronic coupling element is adjustable, during production, with regard to an optimal light path. A coupling part has a coupling device for coupling light out of a light path into at least one light guide element and/or for coupling light out of the at least one light guide element into the light path. A component carrier has one or more optical semiconductors. A first and a second optical deflector are sandwiched between the coupling part and the component carrier. The two optical deflectors, which are disposed parallel to one another, form a light path between the coupling device and the optical semiconductor(s). The light path is optimized by moving the second optical deflector relative to the first, parallel-mounted, optical deflector and by thereby minimizing a loss in conducting the light through. Then the elements are fixed relative to one another.

19 Claims, 2 Drawing Sheets

OPTOELECTRONIC COUPLING ELEMENT AND PRODUCTION METHOD

CROSS-REFERENCE TO RELATED APPLICATION

This application is a continuation of copending International application PCT/DE01/01792, filed May 8, 2001, which designated the United States.

BACKGROUND OF THE INVENTION

Field of the Invention

The invention relates to an optoelectronic coupling element and a method for its production. The optoelectronic coupling element comprises a coupling part, which has a coupling device for coupling light out of a light path into at least one light guide element and/or for coupling light out of the at least one light guide element into the light path, a component carrier with at least one optical semiconductor and deflector, for forming the light path between the coupling device and the at least one optical semiconductor, disposed on it.

Optoelectronic coupling elements of this type are used to establish a coupling between light-generating or light-receiving optoelectronic components and light-guiding elements, in particular optical waveguides. Commonly assigned U.S. Pat. No. 6,315,463 (German patent DE 197 43 992 C1) discloses a method for producing an optoelectronic plug connector element and an optoelectronic plug. The known plug connector element contains an assembly module with two alignment pins, which during the fitting together of the plug connector element with an optical plug are inserted into holes that are formed in the optical plug, in order to achieve an adjustment of the optical waveguides arranged in the plug with regard to the optoelectronic component arranged on the component carrier. For this purpose, the optical waveguides are arranged lying opposite coupling device which couple into the optical waveguides light which has been generated by the optoelectronic component and conducted to the coupling device with the aid of deflector, or couples light out of the optical waveguides into the light path in the deflector, in order to conduct the light coupled out of the optical waveguides to the optoelectronic part, which in this case is designed as a receiver element. The deflector in this case comprise optical elements or components for conducting the light through with little loss, for example lenses or total reflection surfaces.

To ensure transmission of the light with as little loss as possible from the optoelectronic component to the coupling device and back, it is necessary for the coupling device, the deflector and the optoelectronic component or the component carrier to be arranged in a certain way in relation to one another.

SUMMARY OF THE INVENTION

It is accordingly an object of the invention to provide an optoelectronic coupling element and a corresponding production method, which overcomes the above-mentioned disadvantages of the heretofore-known devices and methods of this general type and which provides for an improved possibility of optimizing the light path between the coupling device and the optical semiconductors.

With the foregoing and other objects in view there is provided, in accordance with the invention, a method of producing an optoelectronic coupling element, the method which comprises the following steps:

providing a coupling part having a coupling device for coupling light out of a light path into at least one light guide element and/or for coupling light out of the at least one light guide element into the light path;

providing a component carrier having at least one optical semiconductor arranged thereon;

disposing and fixing a first optical deflector between the coupling part and the component carrier;

arranging a second optical deflector parallel to the first optical deflector to form a light path between the coupling device and the at least one optical semiconductor;

adjusting the second optical deflector by moving the second optical deflector relative to the first optical deflector, for optimizing a light path between the coupling device and the at least one optical semiconductor by minimizing a loss in conducting the light through; and fixing the second optical deflector relative to the coupling part, the at least one optical semiconductor, and the first optical deflector.

With the above and other objects in view there is also provided, in accordance with the invention, an optoelectronic coupling element, comprising:

a light guide device;

a coupling part having a coupling device for one of coupling light into the light guide device and coupling light out of the light guide device;

a component carrier carrying an optical semiconductor; and the light guide device forming a light path between the coupling device and the optical semiconductor, and having a first optical deflector and a second optical deflector arranged parallel to the first optical deflector, the first and second deflectors being mountable separately from one another upon a production of the optoelectronic coupling element, whereby the light path is optimizable by adjustment of the second optical deflector relative to the parallel the first optical deflector.

The invention is based on the principal idea of designing the deflector used for forming the light path between the optical semiconductor and the coupling device in a multi-part form in such a way that, with the aid of an adjustment of the multi-part deflector, a light path optimized with regard to conducting the light through with little loss can be created when producing the optoelectronic coupling element.

In the case of the prior art optoelectronic coupling elements, usually the component carrier with the optical semiconductor is moved relative to the deflector to optimize the light path. However, this allows only a very restricted adjustment or optimization of the light path. The main advantage achieved by the invention in comparison with the prior art is that, with the aid of the relative movement of the optical deflector and the other optical deflector, a fine adjustment of the light path is made possible.

A major advantage is also that the proposed production method can be used in conjunction with customary component carriers, without the component carriers having to be modified in terms of structural design.

In addition, the multi-part form of the deflector makes it possible for the deflector to be used in conjunction with various coupling device and component carriers, certain parts of the deflector being usable for various coupling device or component carriers and other parts of the deflector being individually adaptable to the various coupling device or component carriers.

In accordance with an expedient development of the invention, after arranging the other optical deflector, a further optical deflector is disposed, in order to form a further light path between the coupling device and a further optical semiconductor on the component carrier, so that the optoelectronic coupling element can be designed as a transmitting/receiving element. This allows transceiver components to be produced with the aid of the proposed method.

A development of the invention provides that, after arranging the other and/or the further optical deflector, the component carrier is adjusted, in order to carry out a coarse adjustment of the light path between the coupling device and the at least one optical semiconductor and/or the further light path between the coupling device and the further optical semiconductor, whereby a further optimization of the light path or the further light path is made possible.

An embodiment of the invention preferred with regard to simple adjustment of the component carrier provides that the component carrier is passively adjusted with the aid of the projection arranged on the optical deflector, the projection being arranged in a recess formed on the component carrier.

In accordance with an advantageous feature of the invention, the other and/or the further optical deflector are displaced for adjustment substantially in one plane, whereby a greater accuracy of the adjustment can be achieved, since a relative movement of the other and/or the further optical deflector is restricted with respect to degrees of freedom which, when used in the adjustment, generally contribute only insignificantly to the optimization of the light path or the further light path.

An advantageous feature with regard to fixing the deflector which can be carried out with little effort and at low cost after the adjustment provides that an adhesive agent is applied for fixing the other and/or the further optical deflector in such a way that there is no impairment of the light path and/or the further light path.

An expedient development of the invention provides that, after the fixing of the other and/or the further optical deflector, adjusting means which are designed for adjusting the other and/or the further optical deflector are removed. The adjusting means have the effect on the one hand of creating the possibility of being able to move the other and/or the further optical deflector with sufficient accuracy during the adjustment. On the other hand, the adjusting means can be removed after completion of the adjustment and the fixing of the other and/or the further optical deflector, so that a design of the optoelectronic coupling element that is as compact as possible is enhanced.

An embodiment of the invention preferred with respect to least possible production effort provides that the adjusting means are removed by means of breaking off in the region of a predetermined breaking point from the other and/or the further optical deflector.

Other features which are considered as characteristic for the invention are set forth in the appended claims.

Although the invention is illustrated and described herein as embodied in a optoelectronic coupling element and method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing figures.

DESCRIPTION OF THE PREFERRED EMBODIMENTS

Figure 1:
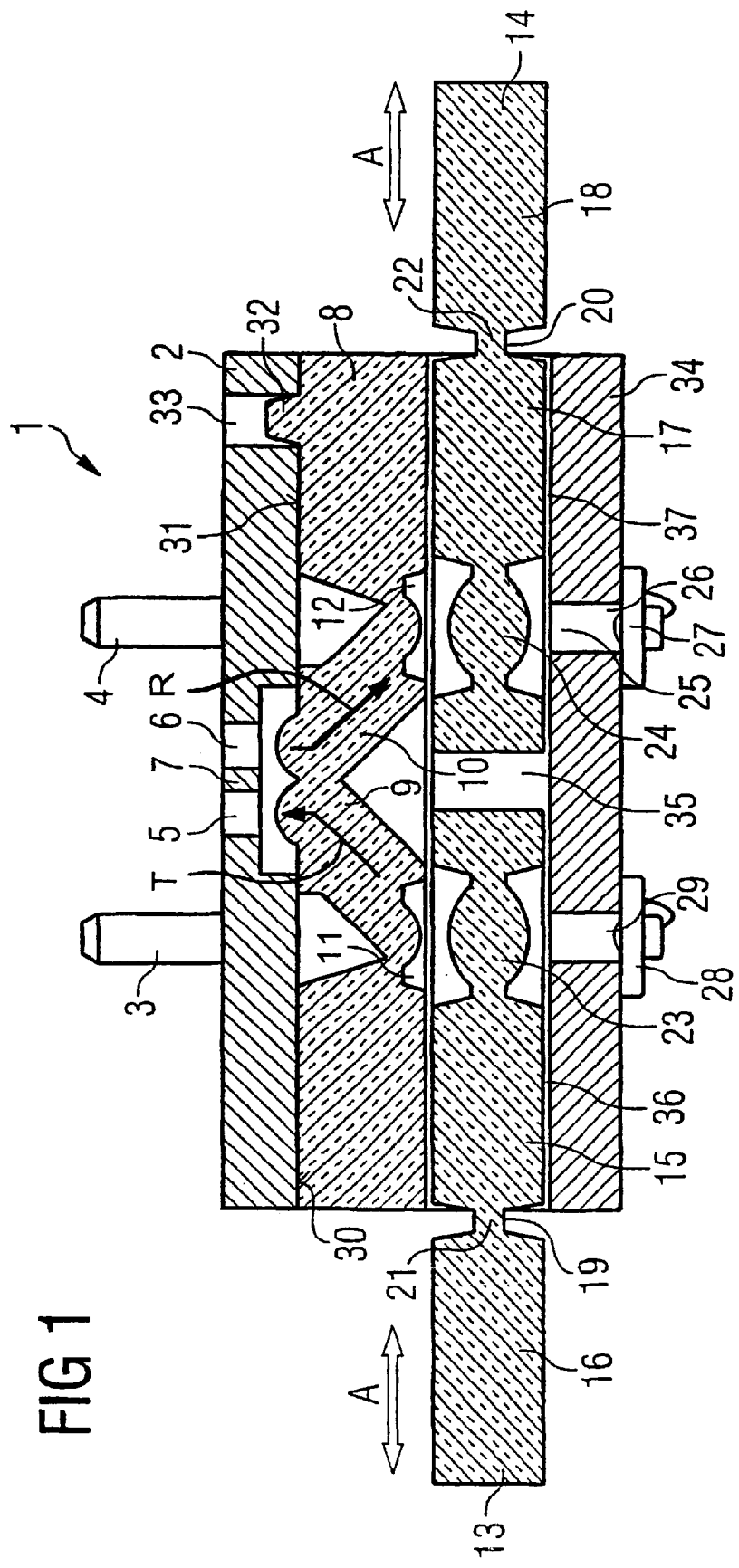
FIG. 1 is a cross-section of an optoelectronic coupling element according to the invention.

Referring now to the figures of the drawing in detail and first, particularly, to FIG. 1 thereof, there is shown an optoelectronic coupling element 1 with a coupling part 2 that is equipped with alignment pins 3, 4. The alignment pins 3, 4 serve the purpose of fixing a non-illustrated plug with regard to a first and a second light-passing opening 5, 6 formed in the coupling part 2, in order to make it possible for light which leaves optical waveguides in the plug or is coupled into the optical waveguides to pass through. The alignment pins 3, 4 engage in holes in the plug during the arrangement of the plug with the optical waveguides, so that the optical waveguides are arranged in relation to the first and second light-passing openings 5, 6. The first and second light-passing openings 5, 6 are preferably formed in such a way that the optical waveguides in the plug have a center-to-center distance of approximately 750 μm.

The first and second light-passing openings 5, 6 are in connection with coupling device 7. With the aid of the coupling device 7, light is conducted out of the optical waveguides of the non-illustrated plug into an optical deflecting part 8 or is coupled out of the optical deflecting part 8 into the optical waveguides. For the further description, it is assumed by way of example that light is coupled with the aid of the coupling device 7 into an optical waveguide which is in connection with a first light-passing opening 5. The light is thereby transmitted through the optical deflector 8 along a light channel 9. With the aid of the coupling device 7, on the other hand, light is coupled out of an optical waveguide which is in connection with the second light-passing opening 6 into another light channel 10 in the optical deflector 8. This is schematically represented in FIG. 1 with the aid of the arrows T and R. Within this setup of the light channels 9, 10, given by way of example, the first light-passing opening 5 is part of a transmitting channel (T) while the second light-passing opening 6 is part of a receiving channel (R).

The light is conducted in the one and the other light channel 9, 10 in each case by utilizing reflections, for example by means of total reflections, metallic or dielectric reflection. At the end 11 or 12, remote from the coupling device 7, of the light channel 9 or of the other light channel 10, respectively, a transfer of the light takes place between the optical deflecting part 8 and a first or a second optical deflecting part 13, 14. The first optical deflecting part 13 has an inner portion 15, arranged inside the optoelectronic coupling element 1, and an outer portion 16, arranged outside the optoelectronic coupling element 1. In the same way, the second optical coupling element 14 has an inner portion 17 and an outer portion 18. The inner portion 15 or 17 and the outer portion 16 or 18 are respectively connected to one another in a region 19 or 20, with a predetermined breaking point 21 or 22 being formed in the region 19 or 20, respectively.

For conducting the light, the first and second optical deflecting parts 13, 14 in each case have a lens-shaped, i.e., lenticular portion 23 or 24, respectively. With the aid of the lenticular portion 24 of the inner portion 17, the light is focused into an opening 25, at the opposite end 26 of which a receiving optical semiconductor 27 is arranged. With the aid of the lenticular portion 23 of the inner portion 15, light which is emitted by a transmitting optical semiconductor 28 and passes through an opening 29 is collected and focused into the light channel 9.

In the production of the optoelectronic coupling element 1, firstly the optical deflector 8 is arranged on an underside 30 of the coupling part 2. For fixing the optical deflector 8, it has on a surface 31 facing the coupling part 2 a projection 32, which engages in a recess 33 in such a way that the optical deflecting part 8 is fixed with regard to the coupling part 2. Also arranged is a component carrier 34, on which the openings 25, 29 are formed and the receiving optical semiconductor 27 and the transmitting optical semiconductor 28 are arranged. In a space 35 between the optical carrier 34 and the optical deflecting part 8, the first and second optical deflecting parts 13, 14 are then fitted.

For the adjustment of the light paths between the coupling device 7 and the transmitting optical semiconductor 28 or the coupling device 7 and the receiving optical semiconductor 27, firstly the component carrier 34 is adjusted in relation to the optical deflector 8. In this way, preferably a coarse adjustment takes place. In the case of the embodiment represented in FIG. 2, a projection 38 formed on the optical deflecting part 8 engages in a recess 39 in the component carrier 34 for the passive adjustment of the component carrier with regard to the optical deflecting part 8.

Figure 2:
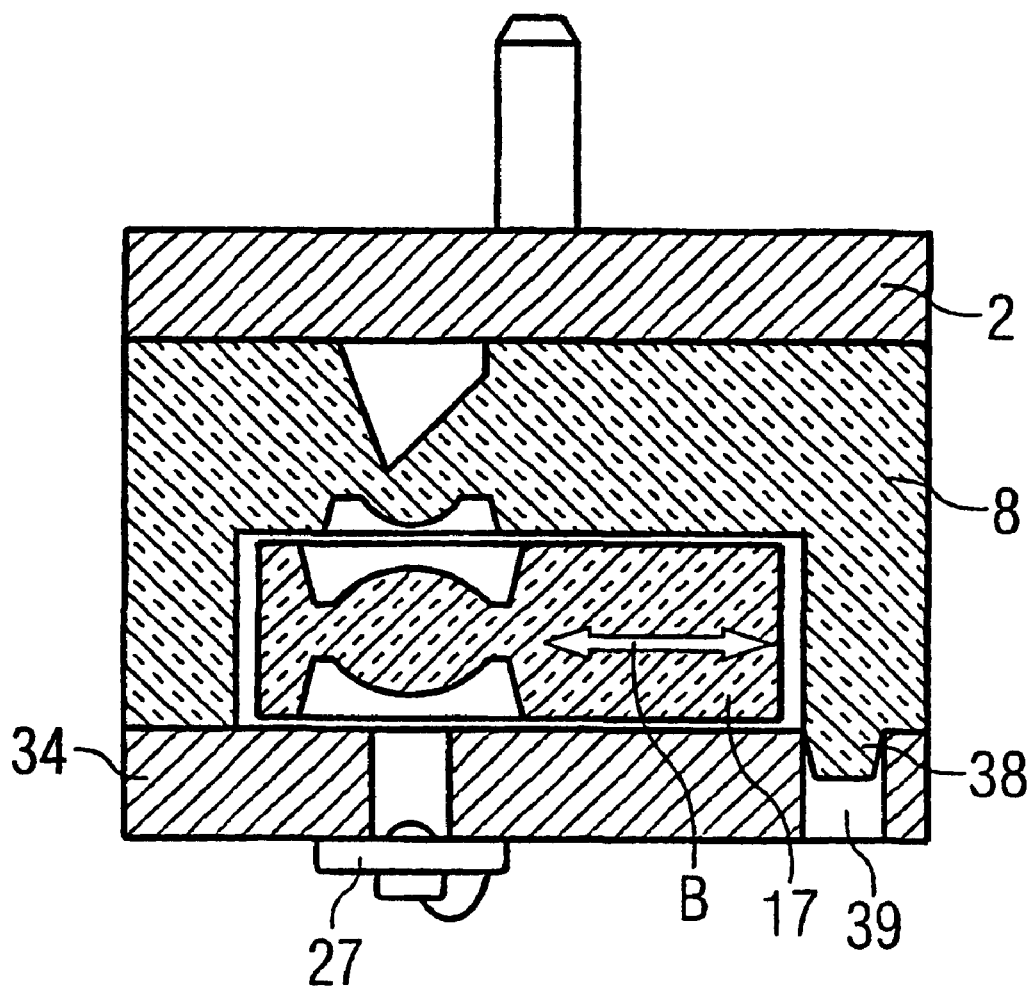
FIG. 2 is a side view of the optoelectronic coupling element according to FIG. 1.

For the fine-tuning of the adjustment of the light paths, subsequently the first and second optical deflecting parts 13, 14 are displaced substantially parallel to the optical deflecting part 8. The displacement preferably takes place substantially in one plane. This is schematically represented in FIGS. 1 and 2 with the aid of the double-headed arrows A and B.

Once the first and second optical deflecting parts 13, 14 have been respectively adjusted to optimize the light paths, an adhesive is preferably applied, in order to fix the first and second optical deflecting parts 13, 14. When the adhesive is being introduced, it must be ensured that cavities 36, 37 which surround the inner portion 15 or 17, respectively, are only filled with adhesive to the extent that the light paths are not impaired. This means in particular that adhesive must not get into the respective lenticular region 23 or 24. The adhesive is preferably a light-curing and/or heat-curing adhesive.

After the fixing of the first and second optical deflecting parts 13, 14 with the aid of the adhesive, the respective outer portion 16 or 18 can be removed, this detachment taking place in the region of the respective predetermined breaking point 21 or 22.

I claim:

1. A method of producing an optoelectronic coupling element, the method which comprises the following steps:

providing a coupling part having a coupling device for coupling light out of a light path into at least one light guide element and/or for coupling light out of the at least one light guide element into the light path;

providing a component carrier having at least one optical semiconductor arranged thereon;

disposing and fixing a first optical deflector between the coupling part and the component carrier;

arranging a second optical deflector parallel to the first optical deflector to form a light path between the coupling device and the at least one optical semiconductor;

adjusting the second optical deflector by moving the second optical deflector relative to the first optical deflector, for optimizing a light path between the coupling device and the at least one optical semiconductor by minimizing a loss in conducting the light through; and fixing the second optical deflector relative to the coupling part, the at least one optical semiconductor, and the first optical deflector.

2. The method according to claim 1, which comprises, after the step of arranging the second optical deflector, disposing a third optical deflector to form a further light path between the coupling device and a further optical semiconductor on the component carrier, for rendering the optoelectronic coupling element suitable as a transmitting/receiving element.

3. The method according to claim 2, which comprises adjusting the second and third optical deflectors by displacing one or both of the second and third optical deflectors substantially in a single plane.

4. The method according to claim 2, wherein the fixing step comprises applying an adhesive agent and fixing the second and third optical deflectors substantially without impairment of the respective light paths.

5. The method according to claim 2, which comprises, after fixing the second and third optical deflectors in place, removing adjusting means configured for adjusting the second and third optical deflector.

6. The method according to claim 5, wherein the removing step comprises breaking off the adjusting means at predetermined breaking points from the second and third optical deflectors.

7. The method according to claim 1, which comprises, after the step of arranging the one or both of the second and third optical deflectors, adjusting the component carrier for carrying out a coarse adjustment of one or both of the light paths between the coupling device and the at least one optical semiconductor and between the coupling device and a further optical semiconductor.

8. The method according to claim 7, which comprises passively adjusting the component carrier with the aid of a projection disposed on the optical deflector, the projection being formed in a recess of the component carrier.

9. The method according to claim 1, wherein the adjusting step comprises displacing the second optical deflector substantially in a single plane.

10. The method according to claim 1, wherein the fixing step comprises applying an adhesive agent and fixing the second optical deflector substantially without impairment of the light path.

11. The method according to claim 1, which comprises, after the fixing step, removing adjusting means configured for adjusting the second optical deflector.

12. The method according to claim 11, wherein the removing step comprises breaking off the adjusting means at a region of a predetermined breaking point from the second optical deflector.

13. An optoelectronic coupling element, comprising:

a light guide device;

a coupling part having a coupling device for one of coupling light into said light guide device and coupling light out of said light guide device;

a component carrier carrying an optical semiconductor; and said light guide device forming a light path between said coupling device and said optical semiconductor, and having a first optical deflector and a second optical deflector arranged parallel to said first optical deflector, said first and second deflectors being mountable separately from one another upon a production of the optoelectronic coupling element, whereby the light path is optimizable by adjustment of said second optical deflector relative to the parallel said first optical deflector.

14. The optoelectronic coupling element according to claim 13, wherein said optical semiconductor is a first optical semiconductor and component carrier carries a second optical semiconductor, said light guide device comprises a third optical deflector mountable separately from said first and second optical deflectors upon the production of the optoelectronic coupling element, whereby a further light path is formed between said second optical semiconductor and said coupling device and the further light path is optimizable by adjusting said third optical deflector.

15. The optoelectronic coupling element according to claim 14, wherein said first optical semiconductor is a transmitting optical semiconductor and said second optical semiconductor is a receiving optical semiconductor.

16. The optoelectronic coupling element according to claim 14, which comprises an amount of adhesive agent affixing at least one of said first, second, and third optical deflectors.

17. The optoelectronic coupling element according to claim 13, which comprises an amount of adhesive agent affixing at least one of said first and second optical deflectors.

18. The optoelectronic coupling element according to claim 13, wherein said coupling part is formed with at least one light-passing opening for a light guide element to be coupled on, and an axis of the light-passing opening extends parallel to an optical axis of said optical semiconductor.

19. The optoelectronic coupling element according to claim 18, wherein the axis of said light-passing opening runs perpendicular to a plane wherein an adjustment of said second optical deflector takes place.

* * * * *